(12) United States Patent
Witt

(10) Patent No.: US 7,084,927 B2
(45) Date of Patent: Aug. 1, 2006

(54) VIDEO PROCESSING

(75) Inventor: Sarah Elizabeth Witt, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 547 days.

(21) Appl. No.: 10/620,671

(22) Filed: Jul. 16, 2003

(65) Prior Publication Data
US 2004/0012607 A1 Jan. 22, 2004

(30) Foreign Application Priority Data
Jul. 17, 2002 (GB) ................... 0216685.8

(51) Int. Cl.
H04N 9/74 (2006.01)
(52) U.S. Cl. .................................... 348/594
(58) Field of Classification Search ............... 348/594, 348/598, 590, 591, 593, 587; 345/639, 640, 345/629; H04N 9/74
See application file for complete search history.

(56) References Cited

U.S. PATENT DOCUMENTS

| 4,218,711 | A | * | 8/1980 | Kashigi | 348/594 |
|---|---|---|---|---|---|
| 4,751,579 | A | * | 6/1988 | Okunishi et al. | 348/594 |
| 4,954,898 | A | * | 9/1990 | Nakata | 348/594 |
| 5,305,108 | A | * | 4/1994 | Trytko | 348/594 |
| 5,412,479 | A | * | 5/1995 | Alig et al. | 348/594 |
| 6,043,852 | A | * | 3/2000 | Nakata | 348/594 |
| 6,366,286 | B1 | | 4/2002 | Hermanson | |

* cited by examiner

Primary Examiner—Michael H. Lee
(74) Attorney, Agent, or Firm—Oblon, Spivak, McClelland, Maier & Neustadt, P.C.

(57) ABSTRACT

A video processing method generates output images for display, each output image having one or more regions derived from a first source image separated by a wipe boundary from one or more regions derived from a second source image, each display position of the source images having an associated transparency coefficient. The method comprises the steps of: preparing the first source image for display in a display memory; defining a wipe origin locus representing a wipe boundary when substantially all of the output image is derived from the first source image and a wipe destination locus representing a wipe boundary when substantially all of the output image is derived from the second source image, points on the wipe destination locus being associated with points on the wipe origin locus, each such pair of associated points defining a respective wipe progression direction; generating a wipe control signal defining proportions of the first and second source images to be displayed with respect to normalised display distance along a wipe progression direction from the wipe origin locus and the wipe destination locus; modifying the transparency coefficient of the first source image held in the display memory, the transparency coefficient of each display position being modified in dependence on value of the wipe control signal corresponding to the normalised display distance along the wipe progression direction between that display position and the wipe origin locus and between that display position and the wipe destination locus; and writing the second source image over the first source image in the display memory so that the first source image is modified by pixels of the second source image in dependence on the transparency coefficient associated with each display position of the first source image.

12 Claims, 13 Drawing Sheets

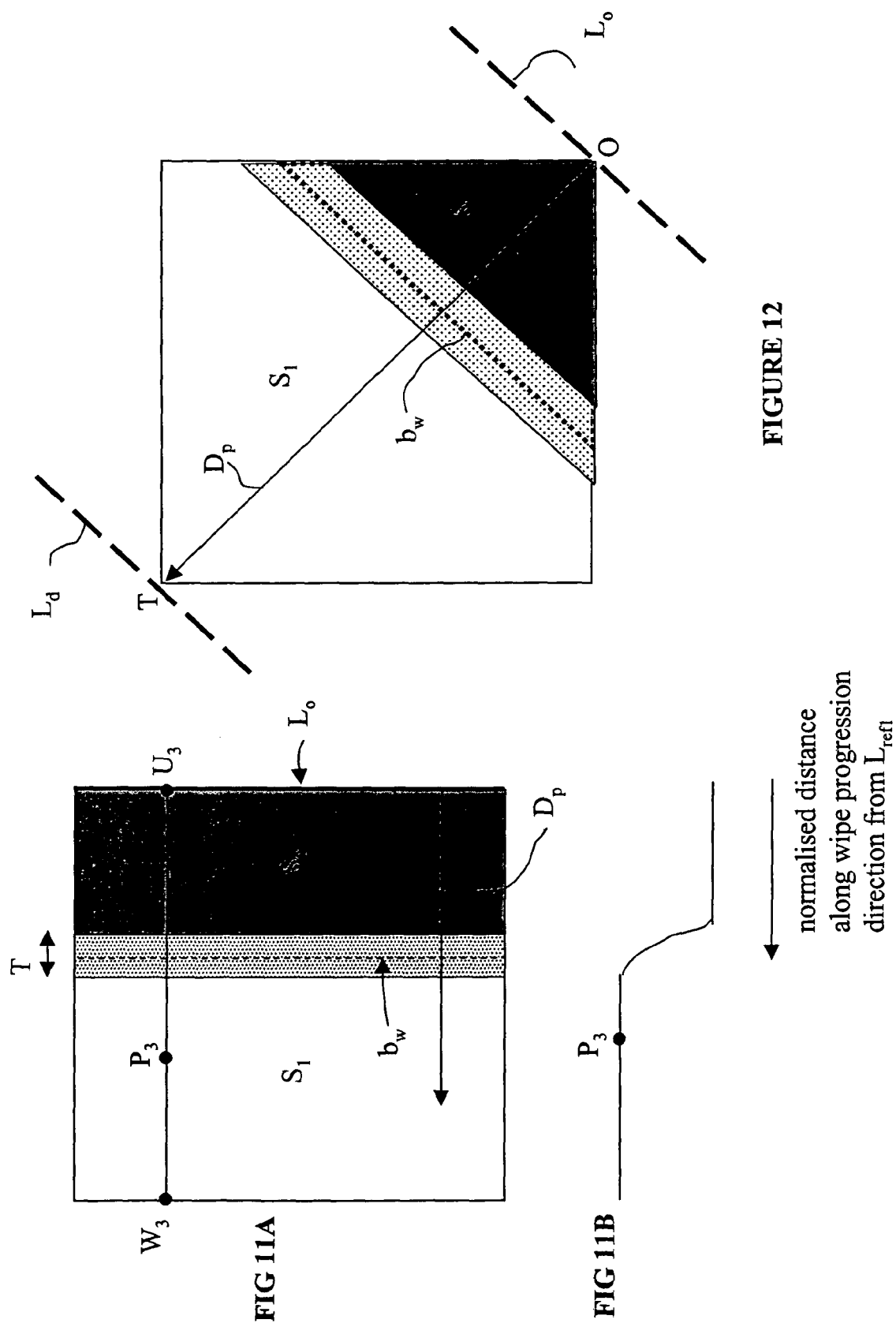

VIDEO PROCESSING

BACKGROUND OF THE INVENTION

1. Field of the Invention

This invention relates to video processing.

2. Description of the Prior Art

The term "video effects" includes a variety of processes which can be applied to video images for display. Some examples are so-called "warp" effects (e.g. page turns, ripple effects), image cropping, texturing, picture-in-picture, chroma-keying and light-source rendering, along with more straightforward mixing effects such as wipes. With current technology, it is almost universal that these effects are applied digitally, so the equipment to do this is often referred to as "digital video effects" (DVE) or "digital multi-effects" (DME) equipment.

DVE equipment can be considered as two categories, real-time and non-real time. Real-time DVE processors have tended to be expensive, of the order of many thousands of pounds, being aimed at the professional market. An example of a real-time DVE processor is the DME 7000 supplied by Sony Corporation. On the other hand, non-real-time DVE equipment aimed at the domestic market can take the form of a personal computer (PC) peripheral card with appropriate software. Such a system might cost in the order of hundreds of pounds and typically allows the user to upload video material (e.g. camcorder material) for editing and effects processing. The effects processing and rendering is then carried out in non-real-time, often taking many hours depending on the complexity of the effects and the processing speed of the host PC. Finally, the rendered material is output for storage on tape or other medium. An example of this type of system is the "Studio DVPlus" supplied by Pinnacle.

Some equipment such as video games machines generates images for display in real time using a polygon-based rendering method. An image to be generated or rendered is divided up into a large number of tessellated primitive polygons, each polygon being a small image area such as a triangular group of pixels. For example, the Playstation 2 supplied by Sony Computer Entertainment Inc can use several different types of graphics primitives, particularly: points, lines, line strips (a group of continuous lines sharing endpoints), triangles, triangle strips (a group of continuous triangles sharing sides), triangle fans (a group of continuous triangles sharing one vertex) and sprites (independent rectangles). In fact, the Playstation 2 can process geometry calculations for up to 66 million polygons per second and curved surface generation at up to 16 million polygons per second.

In order to implement a mixing effect such as a wipe, there is a need to generate a keying signal to control which of two source images is to be displayed at each display position. Often the keying signal is arranged to have a "soft edge", which is to say that over a short screen distance either side of a nominal wipe boundary between the two source images, a mixture of the two source images is displayed. This gives a more gradual change from one source image to the other at the wipe boundary. The keying signal needs to change in response to variation of the wipe boundary by a user control or the like.

A significant feature of implementing a wipe effect is the generation of the keying signal. In the case of a horizontal or a vertical wipe boundary, this is a relatively simple operation. But if the wipe boundary is diagonal, circular or the like, the process can be more difficult to carry out in real time.

By way of example, some professional real-time DVE equipment (such as the DME 7000) implements a circular wipe as follows. First, a pixel position corresponding to the centre of the circular wipe is defined. Then, a right-circular cone about that centre position is generated mathematically, which is to say that each pixel position has assigned to it a value representing the height of such a cone at that pixel's radius from the centre position. Two thresholds are then generated; for any pixel positions having "cone height" values above an upper threshold, one source image is displayed, and for any pixel positions having "cone height" values below a lower threshold, the other source image is displayed. For pixel positions having "cone height" values between the lower and upper thresholds, a mixture of the two source images is displayed. However, the generation of the cone data is somewhat processor intensive and requires a frame memory to store one "cone height" entry for each display pixel. Furthermore, these previous techniques can give rise to visible second order discontinuities at display positions corresponding to the upper and lower threshold levels.

In order to complete the processing needed to implement complex wipe shapes in real time, using equipment which is affordable for amateur or domestic use, there is a need for a less processor intensive technique.

SUMMARY OF THE INVENTION

This invention provides a video processing method for generating output images for display, each output image having one or more regions derived from a first source image separated by a wipe boundary from one or more regions derived from a second source image, each display position of the source images having an associated transparency coefficient, the method comprising the steps of:

preparing the first source image for display in a display memory;

defining a wipe origin locus representing a wipe boundary when substantially all of the output image is derived from the first source image and a wipe destination locus representing a wipe boundary when substantially all of the output image is derived from the second source image, points on the wipe destination locus being associated with points on the wipe origin locus, each such pair of associated points defining a respective wipe progression direction;

generating a wipe control signal defining proportions of the first and second source images to be displayed with respect to a normalised display distance along a wipe progression direction from the wipe origin locus and the wipe destination locus;

modifying the transparency coefficient of the first source image held in the display memory, the transparency coefficient of each display position being modified in dependence on value of the wipe control signal corresponding to the normalised display distance along the wipe progression direction between that display position and the wipe origin locus and between that display position and the wipe destination locus;

writing the second source image over the first source image in the display memory so that the first source image is modified by pixels of the second source image in dependence on the transparency coefficient associated with each display position of the first source image.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 11 illustrates a vertical wipe according to an embodiment of the invention;

FIG. 12 illustrates a diagonal wipe according to an embodiment of the invention;

DESCRIPTION OF THE PREFERRED EMBODIMENTS

Figure 1:
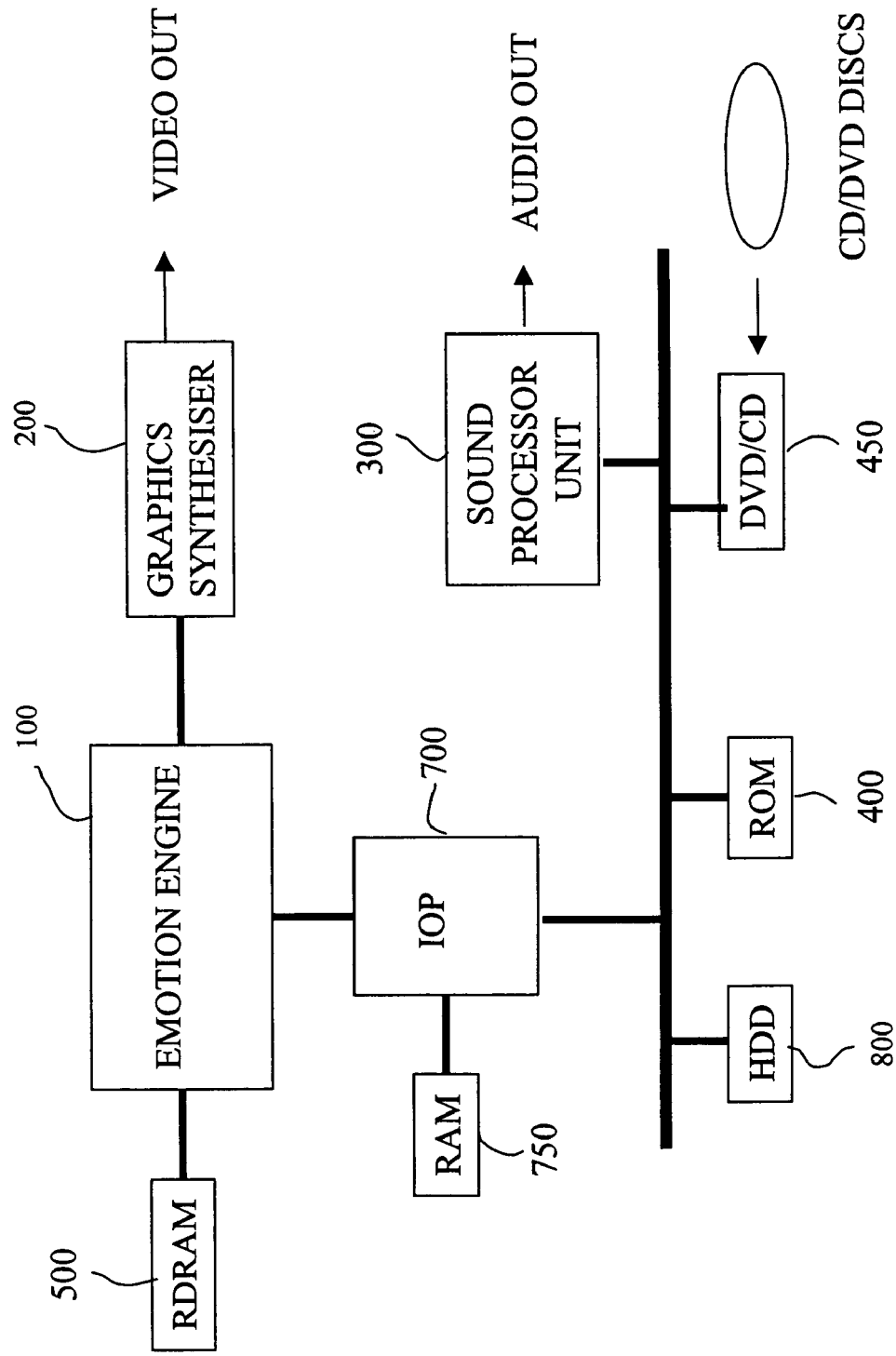
FIG. 1 schematically illustrates the overall system architecture of the PlayStation2.

FIG. 1 schematically illustrates the overall system architecture of the PlayStation2. The system comprises: an Emotion Engine 100; a Graphics Synthesiser 200; a sound processor unit 300 having dynamic random access memory (DRAM); a read only memory (ROM) 400; a compact disc (CD) and digital versatile disc (DVD) unit 450; a Rambus Dynamic Random Access Memory (RDRAM) unit 500; an input/output processor 700 with dedicated RAM 750; and an external hard disk drive (HDD) 800.

The Emotion Engine 100 is a 128-bit Central Processing Unit (CPU) that has been specifically designed for efficient simulation of 3 dimensional (3D) graphics for games applications. The Emotion Engine components include a data bus, cache memory and registers, all of which are 128-bit. This facilitates fast processing of large volumes of multi-media data. Conventional PCs, by way of comparison, have a basic 64-bit data structure. The floating point calculation performance of the PlayStation2 is 6.2 GFLOPs. The Emotion Engine also comprises MPEG2 decoder circuitry which allows for simultaneous processing of 3D graphics data and DVD data. The Emotion Engine performs geometrical calculations including mathematical transforms and translations and also performs calculations associated with the physics of simulation objects, for example, calculation of friction between two objects. It produces sequences of image rendering commands which are subsequently utilised by the Graphics Synthesiser 200. The image rendering commands are output in the form of display lists. A display list is a sequence of drawing commands that specifies to the Graphics Synthesiser which primitive graphic objects (e.g. points, lines, triangles, sprites) to draw on the screen and at which coordinates. Thus a typical display list will comprise commands to draw vertices, commands to shade the faces of polygons, render bitmaps and so on. The Emotion Engine 100 can asynchronously generate multiple display lists.

The Graphics Synthesiser 200 is a video accelerator that performs rendering of the display lists produced by the Emotion Engine 100. The Graphics Synthesiser 200 includes a graphics interface unit (GIF) which handles, tracks and manages the multiple display lists. The rendering function of the Graphics Synthesiser 200 can generate image data that supports several alternative standard output image formats, i.e., NTSC/PAL, High Definition Digital TV and VESA. In general, the rendering capability of graphics systems is defined by the memory bandwidth between a pixel engine and a video memory, each of which is located within the graphics processor. Conventional graphics systems use external Video Random Access Memory (VRAM) connected to the pixel logic via an off-chip bus which tends to restrict available bandwidth. However, the Graphics Synthesiser 200 of the PlayStation2 provides the pixel logic and the video memory on a single high-performance chip which allows for a comparatively large 38.4 Gigabyte per second memory access bandwidth. The Graphics Synthesiser is theoretically capable of achieving a peak drawing capacity of 75 million polygons per second. Even with a full range of effects such as textures, lighting and transparency, a sustained rate of 20 million polygons per second can be drawn continuously. Accordingly, the Graphics Synthesiser 200 is capable of rendering a film-quality image.

The input/output processor 700 has 2 Universal Serial Bus (USB) ports and an IEEE 1394 port (iLink is the Sony Corporation implementation of IEEE 1394 standard). The IOP 700 handles all USB, iLink and game controller data traffic. For example when a user is playing a game, the IOP 700 receives data from the game controller and directs it to the Emotion Engine 100 which updates the current state of the game accordingly. The IOP 700 has a Direct Memory Access (DMA) architecture to facilitate rapid data transfer rates. DMA involves transfer of data from main memory to a device without passing it through the CPU. The USB interface is compatible with Open Host Controller Interface (OHCI) and can handle data transfer rates of between 1.5 Mbps and 12 Mbps. Provision of these interfaces mean that the PlayStation2 is potentially compatible with peripheral devices such as video cassette recorders (VCRs), digital cameras, set-top boxes, printers, keyboard, mouse and joystick.

The Sound Processor Unit (SPU) 300 is effectively the soundcard of the system which is capable of recognising 3D digital sound such as Digital Theater Surround (DTS®) sound and AC-3 (also known as Dolby Digital) which is the sound format used for digital versatile disks (DVDs).

The main memory supporting the Emotion Engine 100 is the RDRAM (Rambus Dynamic Random Access Memory) module 500 produced by Rambus Incorporated. This RDRAM memory subsystem comprises RAM, a RAM controller and a bus connecting the RAM to the Emotion Engine 100.

Figure 2:
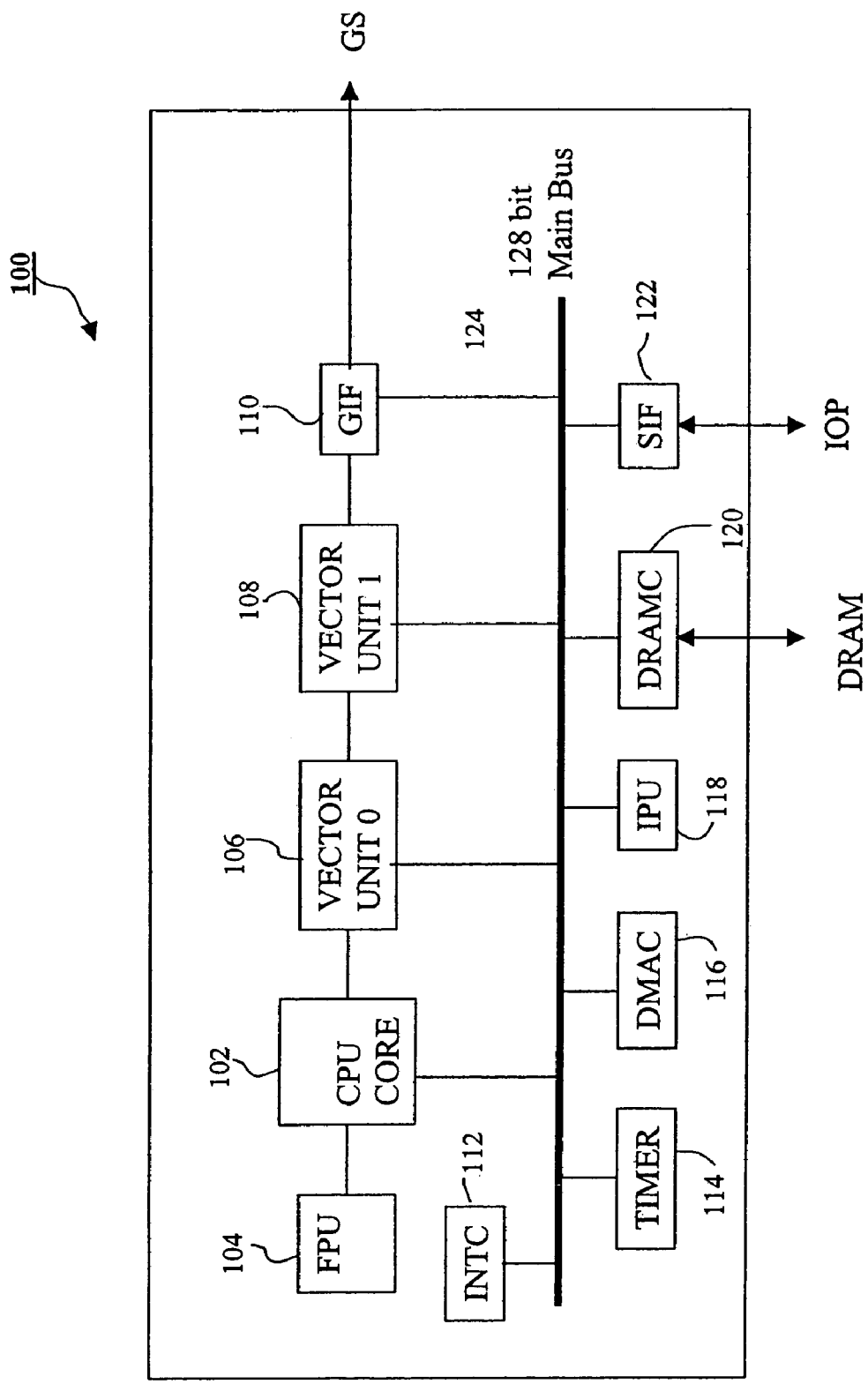
FIG. 2 schematically illustrates the architecture of an Emotion Engine.

FIG. 2 schematically illustrates the architecture of the Emotion Engine 100 of FIG. 1. The Emotion Engine 100 comprises: a floating point unit (FPU) 104; a central processing unit (CPU) core 102; vector unit zero (VU0) 106; vector unit one (VU1) 108; a graphics interface unit (GIF) 110; an interrupt controller (INTC) 112; a timer unit 114; a direct memory access controller 116; an image data processor unit (IPU) 116; a dynamic random access memory controller (DRAMC) 120; a sub-bus interface (SIF) 122; and all of these components are connected via a 128-bit main bus 124.

The CPU core 102 is a 128-bit processor clocked at 300 MHz. The CPU core has access to 32 MB of main memory via the DRAMC 120. The CPU core 102 instruction set is based on MIPS III RISC with some MIPS IV RISC instructions together with additional multimedia instructions. MIPS III and IV are Reduced Instruction Set Computer (RISC) instruction set architectures proprietary to MIPS Technologies, Inc. Standard instructions are 64-bit, two-way superscalar, which means that two instructions can be executed simultaneously. Multimedia instructions, on the other hand, use 128-bit instructions via two pipelines. The CPU core 102 comprises a 16 KB instruction cache, an 8 KB data cache and a 16 KB scratchpad RAM which is a portion of cache reserved for direct private usage by the CPU.

The FPU 104 serves as a first co-processor for the CPU core 102. The vector unit 106 acts as a second co-processor. The FPU 104 comprises a floating point product sum arithmetic logic unit (FMAC) and a floating point division calculator (FDIV). Both the FMAC and FDIV operate on 32-bit values so when an operation is carried out on a 128-bit value (composed of four 32-bit values) an operation can be carried out on all four parts concurrently. For example adding 2 vectors together can be done at the same time.

The vector units 106 and 108 perform mathematical operations and are essentially specialised FPUs that are extremely fast at evaluating the multiplication and addition of vector equations. They use Floating-Point Multiply-Adder Calculators (FMACs) for addition and multiplication operations and Floating-Point Dividers (FDIVs) for division and square root operations. They have built-in memory for storing micro-programs and interface with the rest of the system via Vector Interface Units (VIFs). Vector Unit Zero 106 can work as a coprocessor to the CPU core 102 via a dedicated 128-bit bus 124 so it is essentially a second specialised FPU. Vector Unit One 108, on the other hand, has a dedicated bus to the Graphics synthesiser 200 and thus can be considered as a completely separate processor. The inclusion of two vector units allows the software developer to split up the work between different parts of the CPU and the vector units can be used in either serial or parallel connection.

Vector unit zero 106 comprises 4 FMACS and 1 FDIV. It is connected to the CPU core 102 via a coprocessor connection. It has 4 Kb of vector unit memory for data and 4 Kb of micro-memory for instructions. Vector unit zero 106 is useful for performing physics calculations associated with the images for display. It primarily executes non-patterned geometric processing together with the CPU core 102.

Vector unit one 108 comprises 5 FMACS and 2 FDIVs. It has no direct path to the CPU core 102, although it does have a direct path to the GIF unit 110. It has 16 Kb of vector unit memory for data and 16 Kb of micro-memory for instructions. Vector unit one 108 is useful for performing transformations. It primarily executes patterned geometric processing and directly outputs a generated display list to the GIF 110.

The GIF 110 is an interface unit to the Graphics Synthesiser 200. It converts data according to a tag specification at the beginning of a display list packet and transfers drawing commands to the Graphics Synthesiser 200 whilst mutually arbitrating multiple transfer. The interrupt controller (INTC) 112 serves to arbitrate interrupts from peripheral devices, except the DMAC 116.

The timer unit 114 comprises four independent timers with 16-bit counters. The timers are driven either by the bus clock (at 1/16 or 1/256 intervals) or via an external clock. The DMAC 116 handles data transfers between main memory and peripheral processors or main memory and the scratch pad memory. It arbitrates the main bus 124 at the same time. Performance optimisation of the DMAC 116 is a key way by which to improve Emotion Engine performance. The image processing unit (IPU) 118 is an image data processor that is used to expand compressed animations and texture images. It performs I-PICTURE Macro-Block decoding, colour space conversion and vector quantisation. Finally, the sub-bus interface (SIF) 122 is an interface unit to the IOP 700. It has its own memory and bus to control I/O devices such as sound chips and storage devices.

Figure 3:
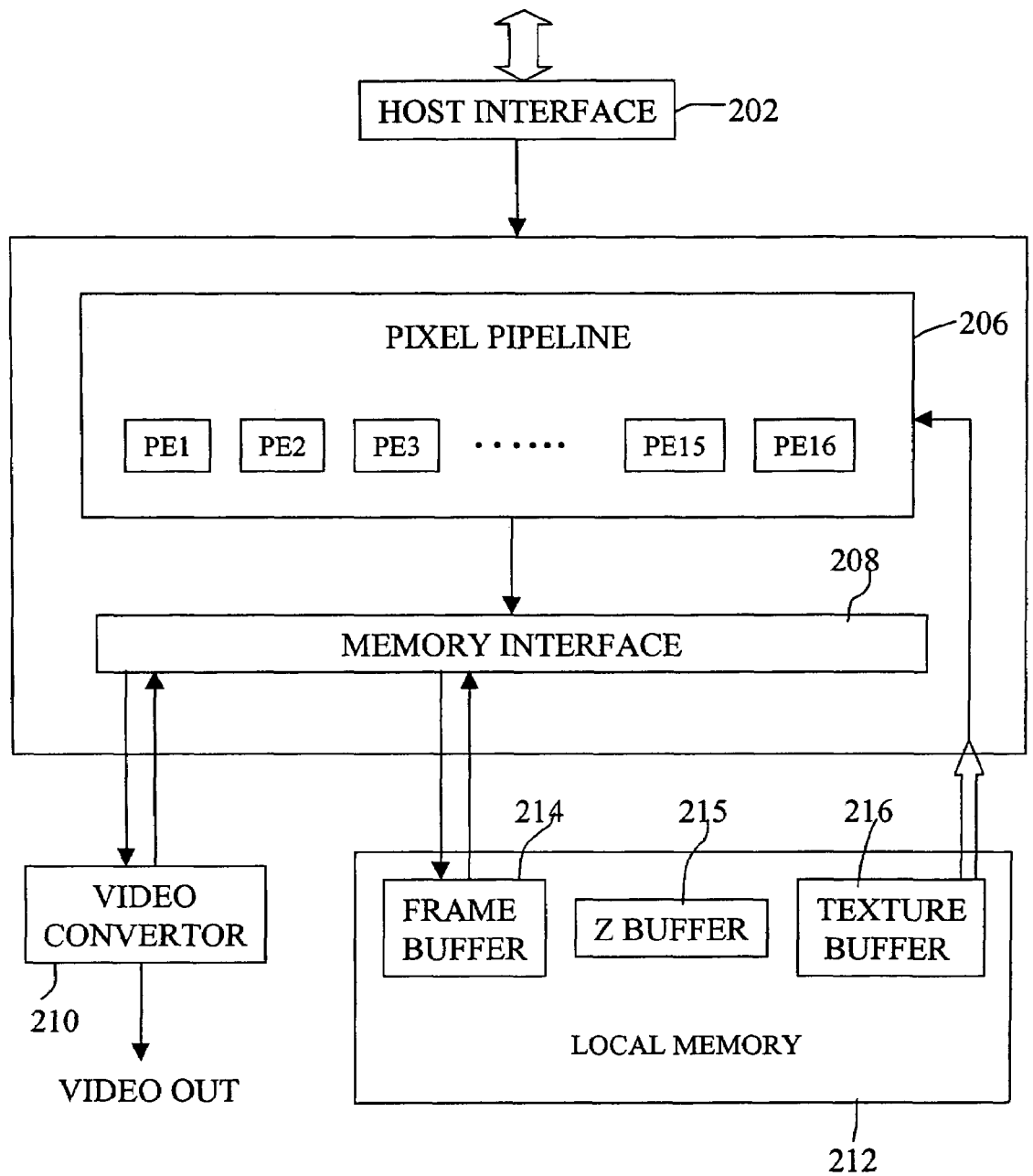
FIG. 3 schematically illustrates the configuration of a Graphic synthesiser.

FIG. 3 schematically illustrates the configuration of the Graphic Synthesiser 200. The Graphics Synthesiser comprises: a host interface 202; a set-up/rasterizing unit 204; a pixel pipeline 206; a memory interface 208; a local memory 212 including a frame page buffer 214 and a texture page buffer 216; and a video converter 210.

The host interface 202 transfers data with the host (in this case the CPU core 102 of the Emotion Engine 100). Both drawing data and buffer data from the host pass through this interface. The output from the host interface 202 is supplied to the graphics synthesiser 200 which develops the graphics to draw pixels based on vertex information received from the Emotion Engine 100, and calculates information such as RGBA value, depth value (i.e. Z-value), texture value and fog value for each pixel. The RGBA value specifies the red, green, blue (RGB) colour components and the A (Alpha) component represents opacity of an image object. The Alpha value can range from completely transparent to totally opaque. The pixel data is supplied to the pixel pipeline 206 which performs processes such as texture mapping, fogging and Alpha-blending (as explained below) and determines the final drawing colour based on the calculated pixel information.

The pixel pipeline 206 comprises 16 pixel engines PE1, PE2 . . . PE16 so that it can process a maximum of 16 pixels concurrently. The pixel pipeline 206 runs at 150 MHz with 32-bit colour and a 32-bit Z-buffer. The memory interface 208 reads data from and writes data to the local Graphics Synthesiser memory 212. It writes the drawing pixel values (RGBA and Z) to memory at the end of a pixel operation and reads the pixel values of the frame buffer 214 from memory. These pixel values read from the frame buffer 214 are used for pixel test or Alpha-blending. The memory interface 208 also reads from local memory 212 the RGBA values for the current contents of the frame buffer. The local memory 212 is a 32 Mbit (4 MB) memory that is built-in to the Graphics Synthesiser 200. It can be organised as a frame buffer 214, texture buffer 216 and a 32-bit Z-buffer 215. The frame buffer 214 is the portion of video memory where pixel data such as colour information is stored.

The Graphics Synthesiser uses a 2D to 3D texture mapping process to add visual detail to 3D geometry. Each texture may be wrapped around a 3D image object and is stretched and skewed to give a 3D graphical effect. The texture buffer is used to store the texture information for image objects. The Z-buffer 215 (also known as depth buffer) is the memory available to store the depth information for a pixel. Images are constructed from basic building blocks known as graphics primitives or polygons. When a polygon is rendered with Z-buffering, the depth value of each of its pixels is compared with the corresponding value stored in the Z-buffer. If the value stored in the Z-buffer is greater than or equal to the depth of the new pixel value then this pixel is determined visible so that it should be rendered and the Z-buffer will be updated with the new pixel depth. If however the Z-buffer depth value is less than the new pixel depth value the new pixel value is behind what has already been drawn and will not be rendered.

The local memory 212 has a 1024-bit read port and a 1024-bit write port for accessing the frame buffer and Z-buffer and a 512-bit port for texture reading. The video converter 210 is operable to display the contents of the frame memory in a specified output format.

Figure 4:
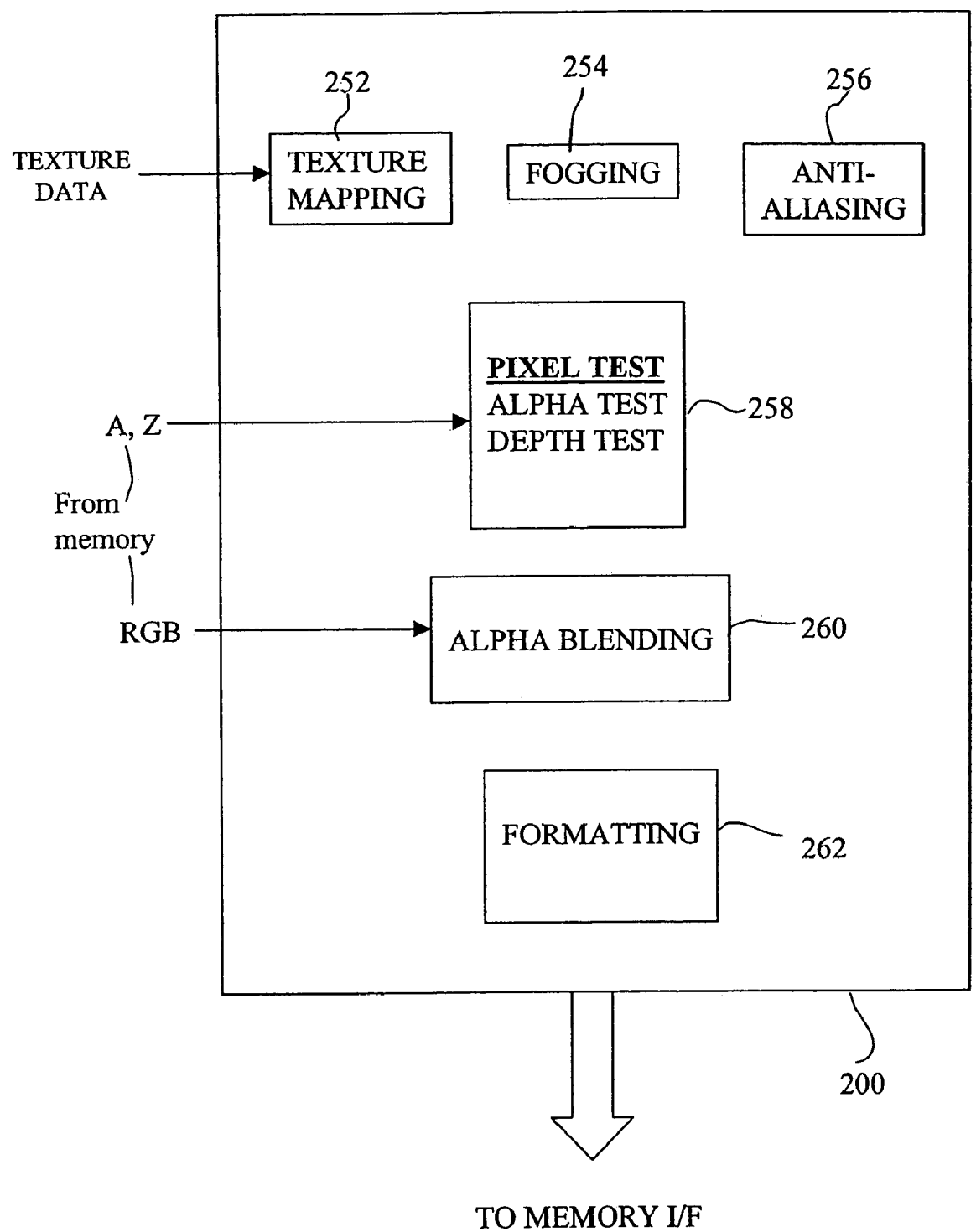
FIG. 4 is a schematic block diagram illustrating the drawing processing performed by the Graphics Synthesiser.

FIG. 4 is a schematic block diagram illustrating the drawing processing performed by the Graphics Synthesiser 200. The drawing processing modules comprise: a texture mapping module 252; a fogging module 254; an anti-aliasing module 256; a pixel test module 258; an alpha blending module 260; and a formatting module 262.

As explained above, the Graphics Synthesiser 200 receives display lists from the Emotion Engine 100. Each display list is pre-processed such that a gradient (e.g. shading coefficient) and other parameters appropriate for drawing graphics primitives are calculated based on vertex information contained in the display list. The pixels of a graphics primitive are generated by a Digital Differential Algorithm (DDA) during a process known as rasterizing. This rasterizing process involves concurrently generating values for 8 or 16 pixels. Essentially a 3D image is transformed into a set of coloured pixels and the colour assigned to each pixel will depend on light sources, the position of the object that the pixel represents, the texture applied to the object and so on. An RGBA value, Z-value, texture value and fog-value is calculated for each pixel based on the gradient value calculated during pre-processing and this data is passed to the pixel pipeline 206.

The texture mapping module 252 maps textures to pixels. Each texture has its own limited palette of colours which are referenced via a colour look-up table (CLUT). The CLUT is needed for 4 or 8 bit colours but not for e.g. 16 or 32 bit colours. The texture mapping module 252 applies a texture function to a texture CLUT-RGBA value read from the texture page buffer 216 and also to the RGBA value (as calculated for pixel values of each graphics primitive using the DDA). The fogging process carried out by the fogging module 254 involves blending part of an image scene with a given colour. This technique can be used to represent fog or to make distant graphics primitives fade away.

The anti-aliasing module 256 performs the process of anti-aliasing which involves smoothing of lines and curves of an image by blending several colours. It is intended to eliminate the undesired jagged or stair-stepped appearance of unfiltered angled lines in an image or graphic. To draw a perfectly smooth diagonal or curved line on a screen would require that only partial areas of some pixels be coloured according to the line. However the screen is composed of a discrete set of pixels and a given pixel cannot be partially coloured so that several smaller lines have to be drawn to represent the desired smooth continuous line. For example if you want to draw a thick black diagonal line on a white background, unless this line is positioned parallel to the screen's main diagonal then the edges of the line will be jagged. The solution provided by anti-aliasing is to colour the pixels associated with the jagged edges in various shades of grey thereby blurring but smoothing the edges of the line.

The anti-aliasing module 256 of the Graphics Synthesiser can perform anti-aliasing for the following graphics primitives: Line, LineStrip, Triangle, Triangle Strip and Triangle-Fan. These are described below with reference to FIG. 5. The anti-aliasing is actually performed by calculating a "coverage" value which is ratio of the area of the actual line which covers each pixel at the edge of the graphics primitive. The coverage value is assumed to be the Alpha value for the pixel and a process known as Alpha-blending (described below) is performed on the destination colour (i.e. the colour in the background of the graphics primitive) and the primitive colour. To achieve proper anti-aliasing it is appropriate to draw graphics primitives in a positional order starting with those furthest in the background and finishing with those closest to the viewer/screen Anti-aliasing is separately performed on the perimeter of each graphics primitive.

The pixel test module 258 receives the RGB values, Alpha values and x, y, z pixel co-ordinates. The Alpha values and Z-values are retrieved by the pixel test module 258 from local memory 212 via the memory interface 208. The pixel test module performs a sequence of tests to determine whether or not to draw a pixel in dependence upon its XYZ and RGBA values. The pixel test does not change the pixel value. The sequence of tests comprises: a scissoring test; an Alpha test; a destination Alpha test and a depth test. The scissoring test checks whether the XYZ co-ordinate values of the pixel to be drawn are in the rectangular (scissoring) area specified in the window co-ordinate system. Pixels determined to be outside the scissoring area are not processed further. The Alpha test involves comparing the Alpha value of the drawing pixel and a pre-set standard Alpha value. Processing continues if the pixel meets the predetermined comparison condition. The Alpha Destination test checks the Alpha value of the pixel for drawing in the frame buffer (i.e. checks the Destination Value). Finally the depth test compares the Z value of the drawing pixel and the corresponding Z value in the Z buffer.

The Alpha Blending module 260 performs a process known as Alpha blending which is a technique used to produce transparency effects (i.e. to represent such things as glass, mist or water), to blend two textures or to map one texture on top of another texture without totally obscuring the texture underneath. More generally, this Alpha-blending technique can be used to blend what has already been rendered (and is thus already in the frame buffer) with another texture.

When Alpha blending is performed two colours are combined: a source colour and a destination colour. The source colour is the contribution from the (at least partially) transparent foreground object. The destination colour is the colour that already exists at the pixel location being considered and thus is the result of rendering some other object that is behind the transparent object. The destination colour is the colour that will be visible through the transparent object. Each coloured pixel within each texture is assigned an Alpha value representing its degree of transparency. The Alpha values are then used to calculate weighted averages of the colours of the two textures for each pixel. For example the following alpha-blending formula may be used:

Final colour=ObjectColour*SourceBlendFactor+
PixelColour*DestinationBlendFactor where ObjectColour is the contribution from the graphics primitive being rendered at the current pixel position and PixelColour is the contribution from the frame buffer at the current pixel location whereas SourceBlendFactor and DestinationBlendFactor are predetermined weighting factors. The Alpha Blending module retrieves RGB values from local memory 212. Blending of the RGB value of a pixel of an object currently being rendered and the corresponding RGB value in frame memory 214 is implemented according to the Alpha value of the pixel or the Alpha value in the frame memory.

Following processing by the Alpha Blending Module 260, the data is supplied to the formatting module 262 where the pixel values for drawing are converted to the data format of the frame buffer. Dithering and colour clamping may also be applied at this stage. The dithering process involves creating a new colour by blending several colours which are already available. This technique can be used to give the illusion that an image was rendered with 64K colours although it was actually rendered with 256 colours. Colour clamping is a process whereby the RGB value of a pixel is controlled to be within the range 0–255 (8-bit value). Since the value of a pixel occasionally exceeds this range after operations such as Alpha-blending the result is stored with 9-bits for each RGB value.

Output from the data formatting module is supplied to the memory interface 208 (FIG. 3) via which read/write is performed to local memory 212. The operations supported by the memory interface include: writing drawing pixel values RGBA and Z to memory following a pixel operation; reading pixel values into the frame buffer e.g. during pixel test and alpha-blending processes; and reading RGBA values from memory for display on the screen.

Figure 5A:
FIGS. 5A to 5G illustrate alternative primitive graphics objects used by the Graphic Synthesiser.
Figure 5B:
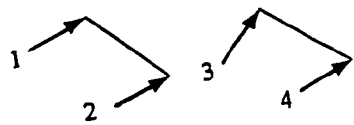
Figure 5C:
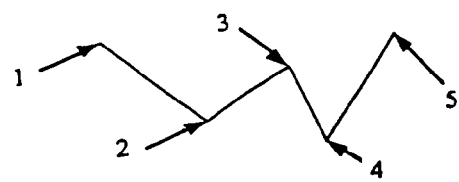
Figure 5D:
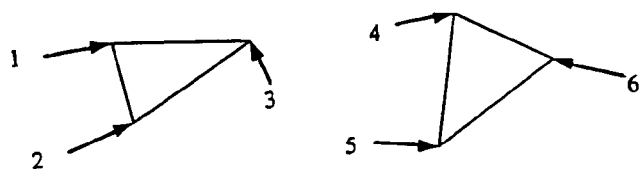
Figure 5E:
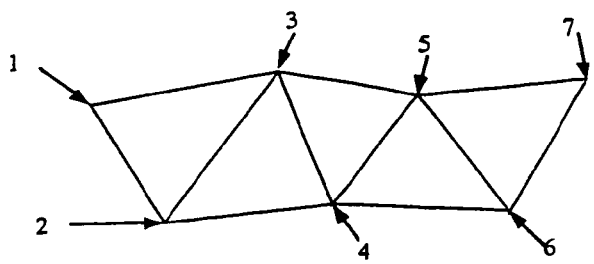
Figure 5F:
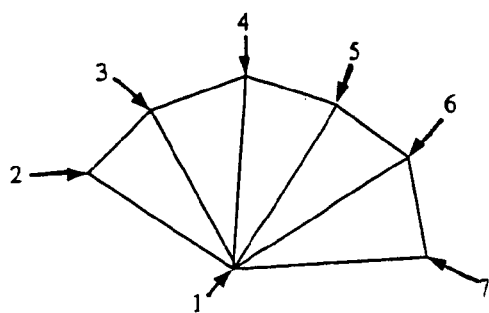
Figure 5G:
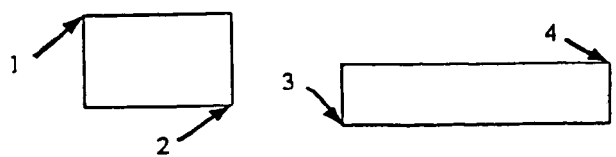

FIGS. 5A to 5G illustrate alternative primitive graphics objects used by the Graphic Synthesiser 200. The alternative graphics primitives comprise a Point, a Line, a LineStrip, a Triangle, a TriangleStrip, a TriangleFan and a Sprite. FIG. 5A illustrates three independent points, each of which is drawn with a single piece of vertex information. FIG. 5B shows two independent Lines, each of which is drawn with 2 pieces of vertex information. FIG. 5C illustrates a LineStrip comprising 4 lines which share endpoints. In this case the first line is drawn with two pieces of vertex information whereas succeeding lines are drawn with a single piece of vertex information. FIG. 5D shows two independent Triangles, each of which is drawn using 3 pieces of vertex information. FIG. 5E illustrates a TriangleStrip comprising 5 triangles which are continuous in that they share sides. In this case the first triangle is drawn using 3 pieces of vertex information and each succeeding triangles is drawn whenever a single piece of vertex information is added. FIG. 5F shows a TriangleFan comprising 5 triangles which share a common vertex 1. The first triangle requires 3 pieces of vertex information whereas succeeding triangles are drawn whenever a single piece of vertex information is added. FIG. 5G shows two independent rectangles known as Sprites. Each Sprite is drawn using 2 pieces of vertex information representing diagonally opposite corners of the rectangle.

The general drawing procedure performed by the Graphics Synthesiser 200 involves: firstly setting the primitive type and initialising the condition of a vertex queue; secondly setting vertex information including drawing co-ordinates, vertex colour, texture co-ordinates and fog coefficients, in vertex information setting registers; thirdly performing a "vertex kick" operation whereby vertex information set up to this point is placed in the vertex queue and the queue goes one step forward; and finally, when the appropriate vertex information is arranged in the vertex queue, commencing the drawing process.

It is appropriate to provide an interface in order to import video and audio data into the PlayStation2. The HDD 900 requires video data in MPEG2 I-frame only format and audio data in PCM format so that hardware is required to convert either DV streams or analogue video/audio into the format required by the HDD. Hardware must also be provided to allow the output video and audio to be converted back to DV format so that it can be digitally recorded by the user.

Figure 6:
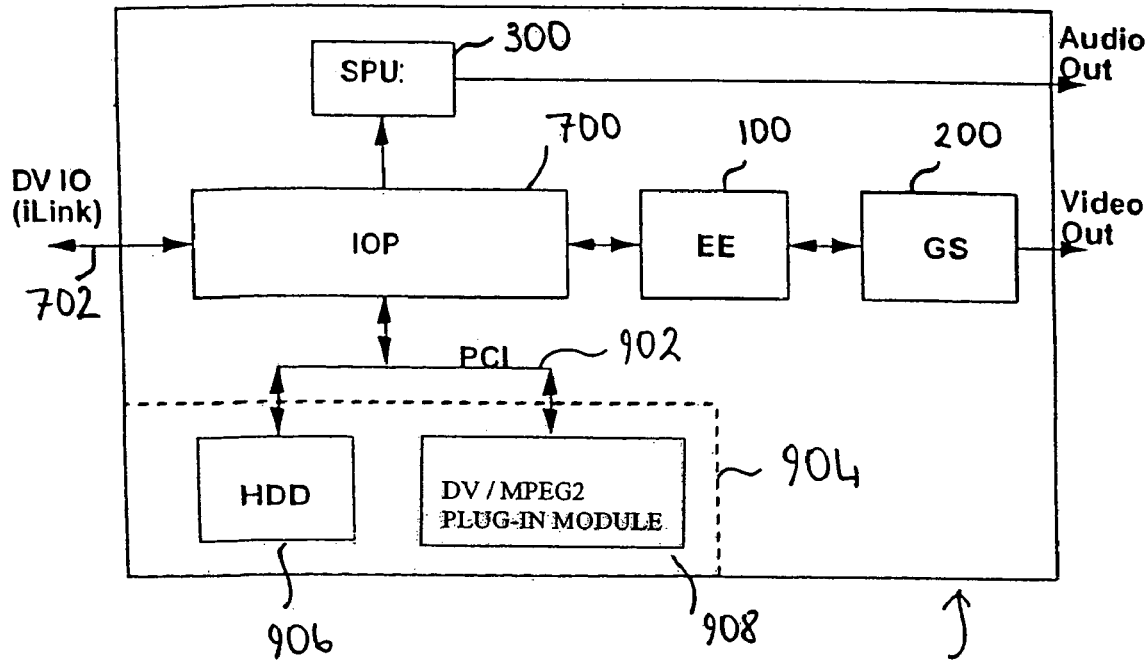
FIG. 6 schematically illustrates a system architecture having a peripheral component interconnect (PCI) plug-in module for digital video input/output.

FIG. 6 schematically illustrates a system architecture having a peripheral component interconnect (PCI) plug-in module for digital video input/output. This apparatus comprises the Sound Processor Unit 300, the IOP 700, the Emotion Engine 100 and the Graphics Synthesiser 200 of the PlayStation2 main unit as described above with reference to FIG. 1. The apparatus of FIG. 6 also comprises a PCI interface 902 to which additional hardware module 904 comprising a hard disc drive (HDD) 906 and a DV/MPEG2 plug-in module 908 is connected. The IOP 700 is provided with 2 USB ports, 2 controller ports and 2 memory card ports and a full-speed 400 Mbps IEEE 1394 (iLink) port 702. DV video is a compression standard for camcorders and video tape recorders. DV format data is stored in binary format rather than analogue format. MPEG2 is a standard developed by the Moving Pictures Expert Group. It is a digital encoding technology capable of encoding a video plus audio bitstream at variable encoding rates up to 15 Mbits/s, with the video occupying up to 9.8 Mbit/s. MPEG2 encoding is used on DVDs.

The so-called "iLink" is the Sony Corporation implementation of the IEEE1394 High Performance serial Bus standard. This standard describes a serial bus or pathway between one or more peripheral devices and a microprocessor device. The iLink provides a single plug-and-socket connection on which up to 63 peripheral devices can be attached. The iLink port 702 of the IOP 700 can be used to import DV video which is routed through to the DV/MPEG2 plug-in module 908 that is attached to the PCI port 902. Using this apparatus output video may be converted from MPEG2 to DV and output through the iLink port 702. To facilitate input of analogue input video/audio data (such as S-Video or Composite video and stereo audio) additional connectors (not shown) must be inserted in the hardware module 904.

The DV/MPEG2 module 908 is used to convert input video data in DV format to MPEG2 video and Pulse Code Modulated (PCM) audio which is then stored on the HDD 906 on input. At the output stage the hardware module 904 may be used to convert output video and audio into DV format which is output via the iLink port 702.

Figure 7:
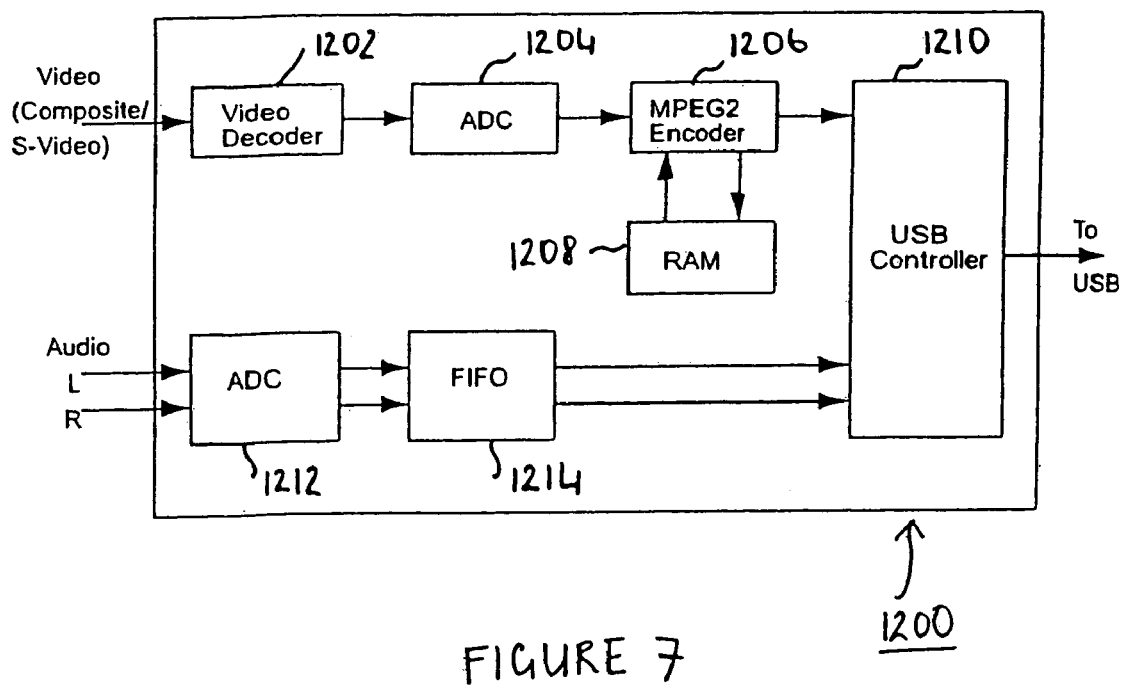
FIG. 7 schematically illustrates a Universal Serial Bus (USB) analogue input module for importing video and audio data into the PlayStation2.

FIG. 7 schematically illustrates a Universal Serial Bus (USB) analogue input module for importing video and audio data into the PlayStation2. USB provides essentially the same plug-and-play capability as the IEEE1394 standard and it is a less expensive technology. However the data transfer rate of USB is limited to 12 Mbps. Although 12 Mbps is sufficient bandwidth to support an MPEG2 I-Frame compressed video stream it is not sufficient bandwidth to support transport of an uncompressed MPEG2 stream back out of the apparatus for conversion back to DV output format. The USB port is capable of supplying limited power (up to 500 mA at 5V) to peripheral devices although this limited power is unlikely to be able to sustain a DV codec as well as an MPEG2 encoder.

The USB module 1200 illustrated in FIG. 7 is nevertheless suitable for use with analogue camcorders since the USB power and bandwidth are sufficient to support analogue-to-MPEG2 conversion. The module 1200 takes analogue video data as input and supplies it in sequence to a video decoder 1202, an analogue-to-digital (ADC) converter and an MPEG2 encoder 1206 which has an dedicated a RAM module 1208. Audio data is input to the module and left and right (L and R) audio channels are fed first through an ADC module 1212, the digital output of which is temporarily stored in a FIFO buffer 1214. Both the MPEG2 video data output by the encoder 1206 and the digital audio data from the FIFO buffer are supplied to a USB controller 1210. The USB controller supplies the data to the PlayStation2 via a USB port.

Figure 8:
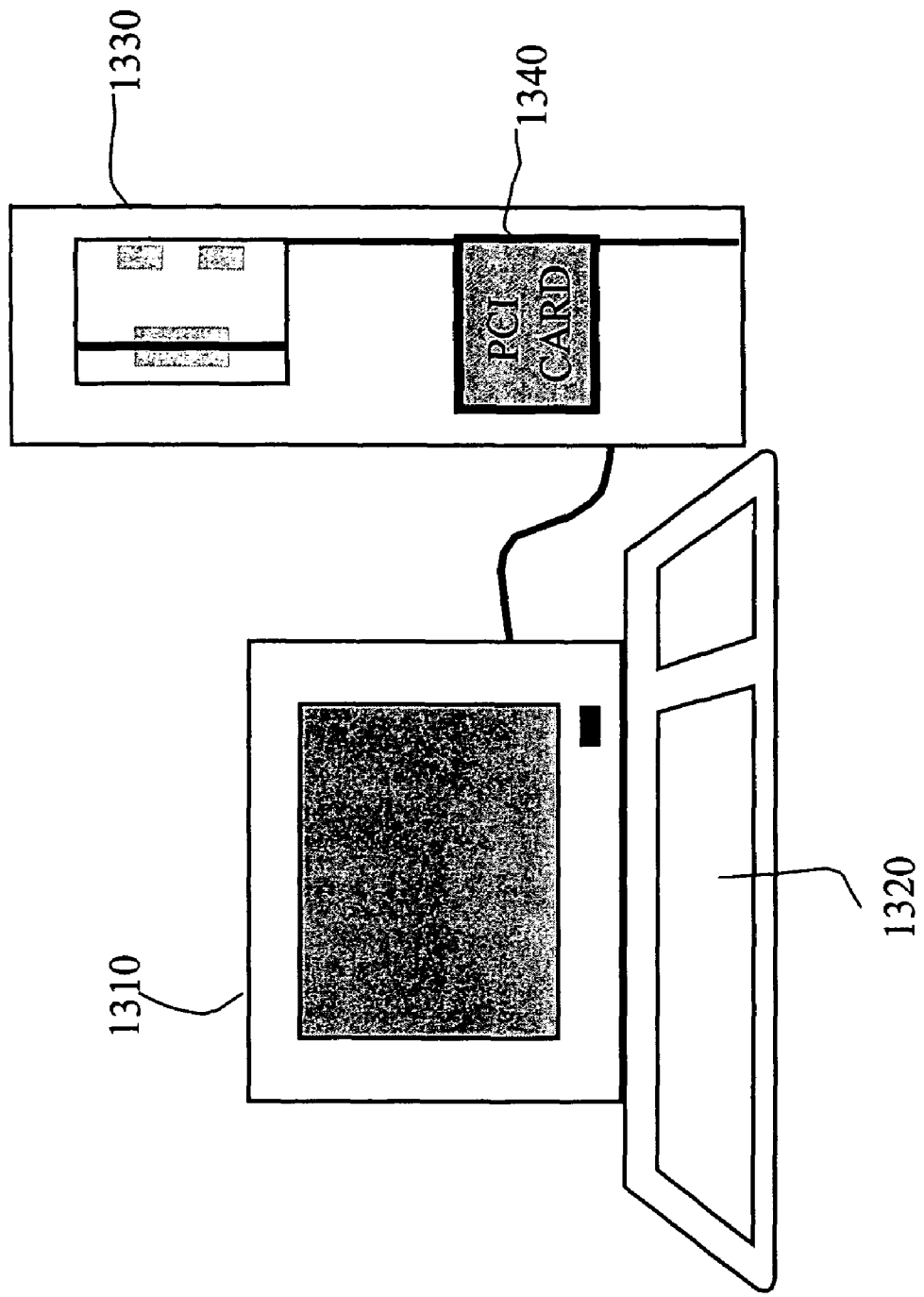
FIG. 8 schematically illustrates an embodiment of the invention in which the circuitry required to implement the real-time video editing is provided on a PCI card fitted to a standard personal computer.

FIG. 8 schematically illustrates an embodiment of the invention in which the circuitry required to implement the real-time video editing is provided on a PCI card fitted to a standard personal computer (PC). This figure comprises a monitor 1310, a keyboard 1320, a system unit 1330 and a PCI card 1340 fitted within the system unit 1330. In this embodiment the SPU 300, IOP 700, Emotion Engine 100, Graphics Synthesiser 200 and DV/MPEG2 module 908 functionality is all provided via the PCI card 1340. In this case the hard disc drive of the PC itself is used to import video and audio data to the system.

Figure 9:
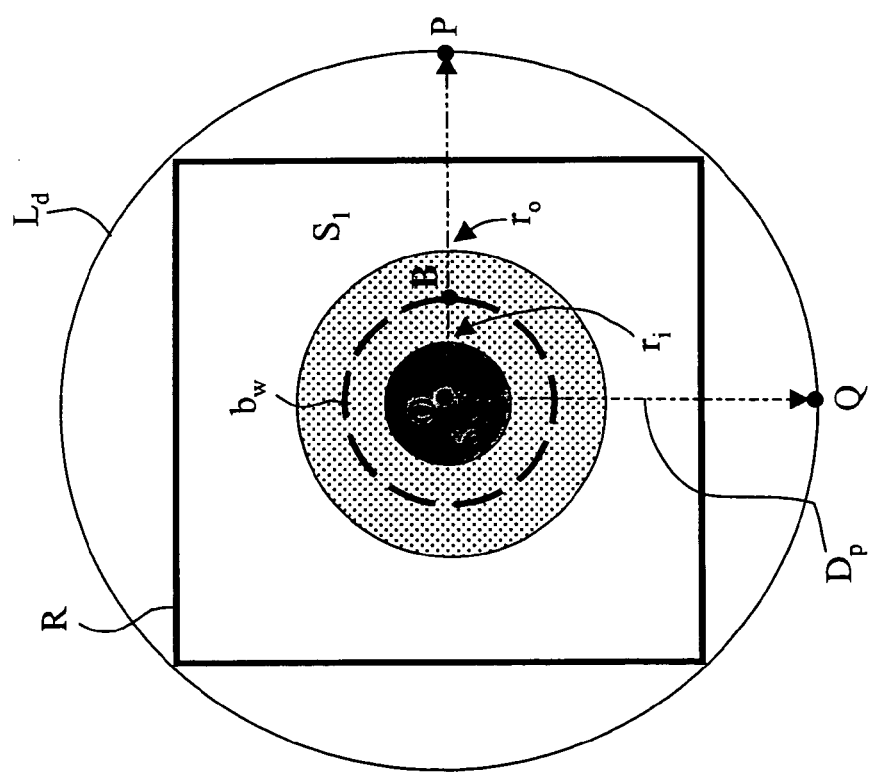
FIG. 9 schematically illustrates a circular wipe according to an embodiment of the invention.

FIG. 9 schematically illustrates a circular wipe according to an embodiment of the invention. In particular, this Figure represents a single stage or snapshot of the wipe progression. In this example embodiment, at 0% wipe progression a first source image $S_1$ completely fills the screen, whereas at 100% wipe progression a second source image $S_2$ completely fills the screen. At intermediate stages the second source image $S_2$ progressively replaces a central circular portion of $S_1$ having radius r. As the wipe progresses, the radius r increases until the entire screen is filled by the second source image $S_2$.

The 100% wipe progression stage does not always correspond to the screen being completely filled with source image $S_2$. In alternative embodiments, 100% wipe progression may correspond, for example, to a 50:50 screen occupation ratio between source image $S_1$ and source image $S_2$. The wipe progression is typically controlled by a human editor via a user-control provided on a user interface such as an editing console. Alternatively the wipe could be automatically set (e.g. in software) to progress at a predetermined rate. Further user-controls are provided to allow for selection of the type of wipe to be performed e.g. vertical, diagonal, circular, clock, heart or star.

The circular wipe of FIG. 9 has a "wipe origin locus" which is a single point O at the centre of the circle defining a wipe boundary as explained below. For alternative wipe geometries, the wipe origin locus could be a straight line, a curved line or even a small fixed-dimension outline of the wipe shape itself. A vertical wipe has a wipe origin locus that is a straight vertical line typically located at either the extreme left or extreme right hand edge of the screen. A diagonal wipe has a wipe origin locus that is a straight diagonal line. For wipe geometries such as star-shapes or heart-shapes, the wipe origin locus can be defined to be a small star-shape or heart-shape corresponding to an early stage of the wipe progression (see FIG. 11).

To determine the degree of progression of a wipe, a "wipe destination locus" Ld is defined. The wipe destination locus Ld is defined to be the location of the wipe boundary at (at least) 100% wipe progression. The wipe destination locus Ld is not restricted to the on-screen area but in fact would normally extend to off-screen co-ordinate values. The off-screen co-ordinate values cannot be plotted but serve as a mathematical abstraction used to implement the wipe. In FIG. 9 the circular wipe destination locus is a circle of radius OP which lies within the screen area.

For the circular wipe of FIG. 9, the displayed image in the inner image region $r \leq r_i$ is completely derived from $S_2$, whereas the image displayed in the outer image region $r \geq r_o$ is completely derived from $S_1$. However for $r_i < r < r_o$ there is a "transition region" T in which the displayed image is derived from a predetermined mix of $S_1$ and $S_2$. The mix is appropriately controlled to effect a smooth rather than a sharp transition in the interface region between the first source image and the second source image. A nominal "wipe boundary" $b_w$ is defined by the circumference of a circle of radius $r_b$ at which the proportions of the two source images are equal. In general, for symmetrical boundary regions, the wipe boundary will correspond to the locus of the centre of the transition region measured along the outward radial wipe progression direction. A "wipe progression direction" can be defined for arbitrary wipe geometry by connecting a first point on the wipe origin locus Lo (in this case, the point O) to an associated second point on the wipe destination locus Ld. There exists a mapping between a point or points of the wipe origin locus and points on the wipe destination locus Ld. This mapping defines how wipe boundary evolves as the wipe progresses. Accordingly, a wipe progression vector from the point on the wipe origin locus O to the associated point on the wipe destination locus Ld defines the wipe progression direction. For horizontal, vertical and diagonal wipes, the wipe boundary bw is simply translated from the wipe origin locus to the wipe destination locus as the wipe progresses. For heart and star wipes, the wipe boundary bw is evolved by progressively magnifying the shape formed by the wipe origin locus, as if projecting an image of the current wipe boundary onto a more distant focal plane.

In the example embodiment of FIG. 9, there is a 50:50 mix between source images $S_1$ and $S_2$ for display pixels coinciding with the wipe boundary. Moving away from any given point on the wipe boundary along the wipe progression direction Dp (which in this case is an outward radial direction passing through the given point), the proportion of $S_1$ progressively increases within the transition region up to 100% at the transition region outer boundary radius $r_o$. Moving in the opposite direction, away from the wipe boundary and towards the wipe origin, the proportion of $S_2$ gradually increases until reaching 100% at the transition region inner boundary radius $r_i$. Consider for example moving from the point B on the wipe boundary bw, along the associated wipe progression direction OP.

In order to perform the wipe it is appropriate to define the wipe geometry, the boundaries of the transition region $r_i$ and $r_o$ and the functional form of the mix in the transition region. A discrete set of points forming the wipe destination locus and the wipe origin locus is either generated in real-time or retrieved from memory in response to user-selection from a menu of available wipe geometries. As shown in FIG. 9, the wipe destination locus Ld is defined to be outside the screen area to ensure that the 100% wipe stage corresponds to the screen being completely filled by $S_2$.

Figure 10:
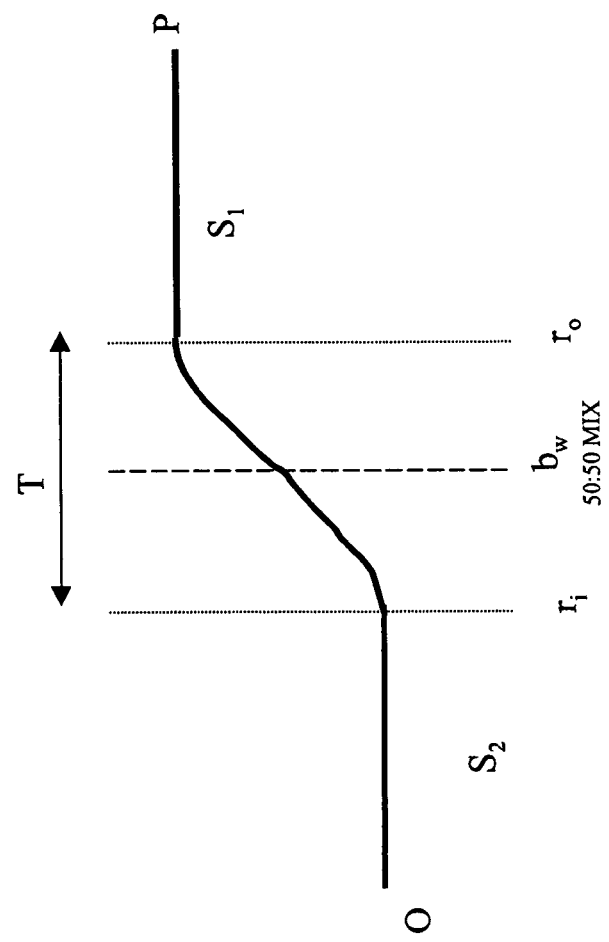
FIG. 10 schematically illustrates a wipe control signal according to an embodiment of the invention.

FIG. 10 schematically illustrates a wipe control signal according to an embodiment of the invention. In this case a single parameter, the normalised distance of a given display position from the wipe origin measured along the wipe progression direction is determined and the functional form of the wipe control signal illustrated in FIG. 10 is used to specify the relative proportions of each source image to be displayed at that display position in dependence upon the determined distance.

Figure 13:
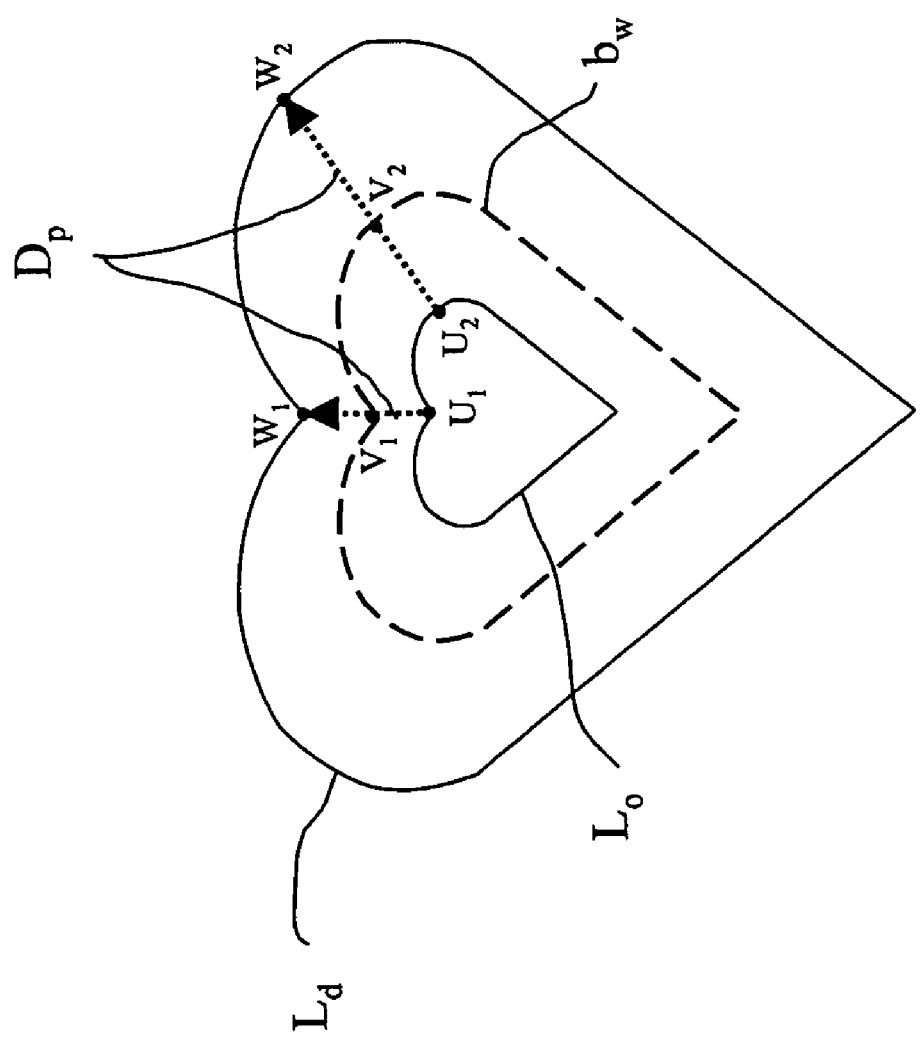
FIG. 13 schematically illustrates a heart shaped wipe according to an embodiment of the invention.

For the circular wipe geometry of FIG. 9, the relative proportions of the source images $S_1$ and $S_2$ at a given display position could be consistently defined in terms of the absolute distance along the wipe progression direction. It can be seen from the figure that along the lines OP and OQ, the same mix proportion corresponds to the same absolute distance. As explained below with reference to FIG. 13, the same rule does not apply more irregular wipe geometries.

Consider taking a sample of pixel values along the line OP in FIG. 9. The wipe control signal of FIG. 10 defines the source image composition of the displayed image as a function of distance x along the line OP. Accordingly the wipe control signal has zero gradient and a constant y-value $y_2$ (associated with $S_2$) in the region $0 \leq x \leq r_i$, which corresponds to the inner region where the displayed image is derived from $S_2$ only. Similarly the wipe control signal has zero gradient and a different constant y-value $y_1$ (associated with $S_1$) in the region $r_o \leq x \leq P$ which corresponds to the outer region where the displayed image is derived from $S_1$ only. However in the region $r_i < x < r_o$, the wipe control signal smoothly varies from the first constant y-value to the second constant y-value and defines the relative proportions of the image derived from S1 and S2 as the transition region is traversed. For example the mix in the transition region could be defined by $\alpha a y_1 + (1-\alpha) y_2$ where a is a variable that satisfies boundary conditions $\alpha=0$ at $x=r_i$; $\alpha=1$ at $x=r_o$ and $\alpha=0.5$ at the wipe boundary. Here, $y_i$ is an RGB value corresponding to source image $S_i$.

The functional form of the wipe control signal is not by any means restricted to the functional form shown in FIG. 10. In alternative embodiments the wipe control signal may be characterised, for example by a sinusoidal curve in the transition region and although the gradient must be zero for the inner and outer image regions, the values $y_1$ and $y_2$ can be appropriately selected. As will be explained below, the y value of the wipe control signal is used to replace in the frame memory, the alpha channel values of pixels of the first source image Si during implementation of the wipe.

As explained above, the prior art system implements the circular wipe using a 3-dimensional wipe function representing a right circular cone and the transition region boundaries $r_i$ and $r_o$ are defined via upper and lower cone height thresholds. The cone height value for each pixel depends upon the radius of that pixel from the wipe origin O and this ultimately determines whether that pixel belongs to the inner image region, the outer image region or the transition region. By way of contrast, this embodiment of the invention uses a 1-dimensional wipe control signal rather than a 3-dimensional cone function to define the relative proportions of the two source images displayed at each pixel. The wipe control signal is used to modify the alpha channel of the first source image in screen memory. The second source image is subsequently applied according to a mix defined by the modified alpha channel.

FIG. 11A schematically illustrates a vertical wipe according to an embodiment of the invention. In this case the second source image $S_2$ progressively replaces the original source image $S_1$ as the wipe progresses. The wipe boundary traces out a path starting from a wipe origin locus at the right hand edge of the screen and finishing at a wipe destination locus at the far left-hand edge of the screen. In this case the vertical line Lo is the wipe origin locus and a parallel line (not shown) at the left hand edge of the screen is the wipe destination locus. A nominal wipe boundary $b_w$ is defined in the centre of the transition region and parallel to the wipe origin and wipe destination loci. In this case, for a given display point $P_3$, the relative proportions of $S_1$ and $S_2$ in the displayed image is defined by the wipe control signal. The x co-ordinate of the wipe control signal is given by the normalised distance $U_3P_3/U_3W_3$ along the wipe progression direction defined by the vector $U_3W_3$. FIG. 11B shows the value of the wipe control signal corresponding to display point $P_3$.

FIG. 12 schematically illustrates a diagonal wipe according to an embodiment of the invention. In this case the second source image $S_2$ progressively replaces the current source image S1 as the wipe progresses. The wipe origin locus is an off-screen diagonal line that intercepts the bottom right-hand corner of the screen. The wipe destination locus is likewise an off-screen diagonal line parallel to the wipe origin locus which intercepts a the top left hand corner of the screen. The normalisation factor for the distance measured along the wipe progression direction is the magnitude of the vector OT. As for the circular wipe and the vertical wipe, each wipe progression vector has the same normalisation factor. In this case the wipe control signal of FIG. 11B could be that associated with the central diagonal OT.

In the example embodiments relating to the circular wipe, vertical wipe and diagonal wipe, the absolute distance along the wipe progression direction could be used to correlate a given display position to the appropriate alpha value on the wipe control signal, a single wipe control signal being applied to the wipe progression trajectory of every point on the wipe origin locus. However for more irregular wipe shapes it is appropriate to define a normalised distance so that a single wipe control signal can be used at a given wipe progression stage. In the case of a heart-shaped wipe illustrated in FIG. 13, the relationship between the absolute distance along the wipe progression direction and the mixture ratio will depend on the particular wipe progression trajectory, or equivalently on the particular pair of wipe origin locus points and wipe destination locus points that is chosen. For example, first consider the wipe progression direction defined by the vector from point $U_1$ to point $W_1$ and compare this to the wipe progression direction defined by the vector from point $U_2$ to point $W_2$. At pixels associated with points such as $V_1$ and $V_2$ on the wipe boundary there is a 50:50 mix between source images $S_1$ and $S_2$. It is apparent from FIG. 13 that the absolute distance $U_1V_1$ is substantially less than the distance $U_2V_2$. To facilitate the use of a single wipe function for all pairs of points in the mapping between wipe origin locus and wipe destination locus, the normalised distance along the wipe direction is used rather than the absolute distance. Accordingly, the distance $U_1V_1$ is normalised by dividing it by the magnitude of vector $U_1W_1$ and similarly, the distance $U_2V_2$ is normalised by dividing it by the magnitude of vector $U_2W_2$. Due to the manner in which the wipe is progressed, the ratio $U_iV_i:U_iW_i$ is the same for all points i, where $U_i$, $V_i$ and $W_i$ correspond respectively to points on the wipe origin locus, wipe boundary and wipe destination locus along a given wipe progression vector i.

Figure 14:
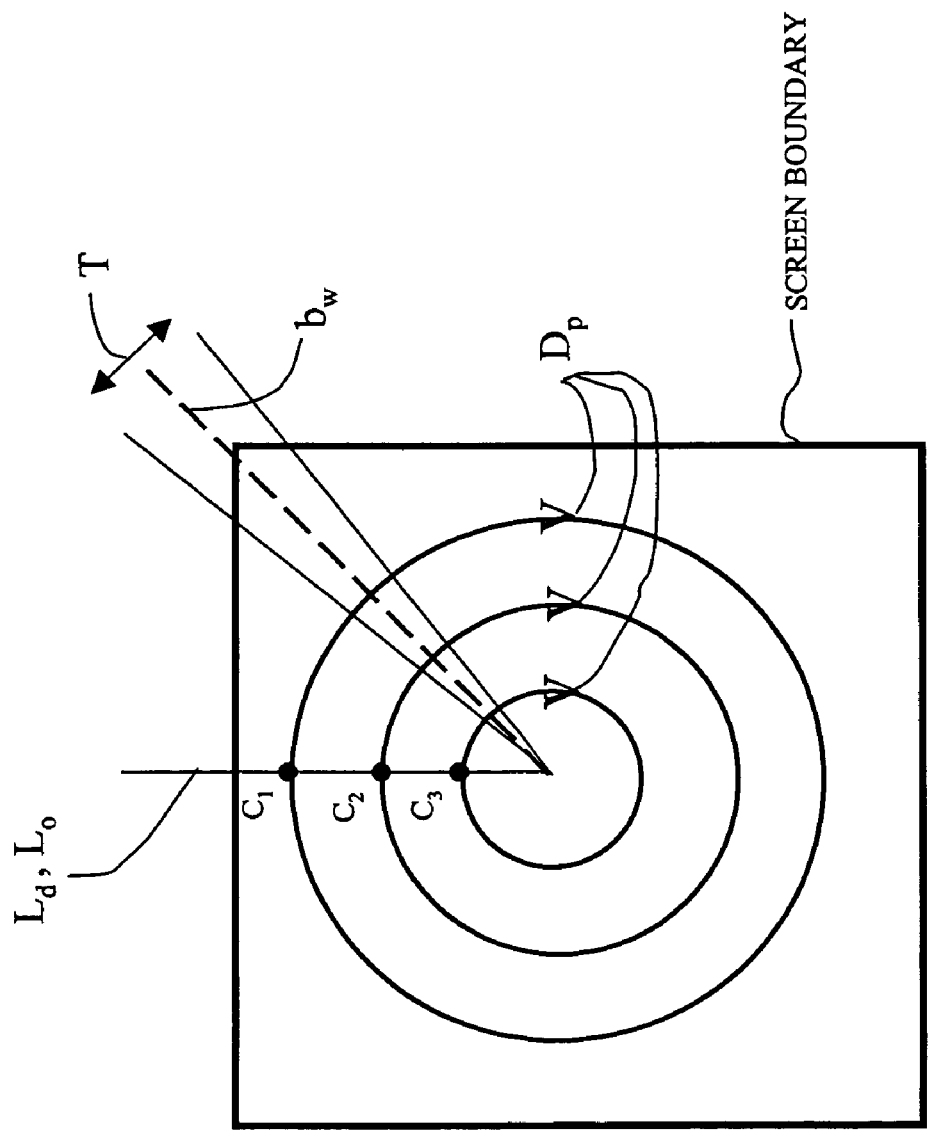
FIG. 14 schematically illustrates a clock wipe according to an embodiment of the invention.

FIG. 14 schematically illustrates a clock wipe. In this case the wipe origin locus is coincident with the wipe destination locus and the wipe progression direction is defined by a series of clockwise circular paths which map a given point on the wipe origin locus to itself by a circuitous trajectory in the image plane. Three wipe progression trajectories are shown corresponding to wipe origin locus points C1, C2 and C3. In this case the normalisation distance for a given wipe progression trajectory is the circumference of the circle corresponding to that trajectory. As the wipe progresses source image S2 occupies a segment of the screen area bounded by the wipe origin locus and the wipe boundary and this segment progressively increases in size, reducing the visible area of source image $S_1$ until it source image $S_2$ finally accommodates the full screen.

The clock wipe could alternatively be performed by dividing the visible screen area into four equal sections converging at the screen centre, by means of a central vertical division and a central horizontal division. The wipe boundary would lie within one of the sections. The other three sections are set to either $S_1$ or $S_2$, and a simple diagonal wipe is implemented within the section having the wipe boundary. The diagonal wipe is such that the wipe boundary extends from the centre point of the screen though that section at the correct angle for the current position of the clock wipe.

Figure 15B:
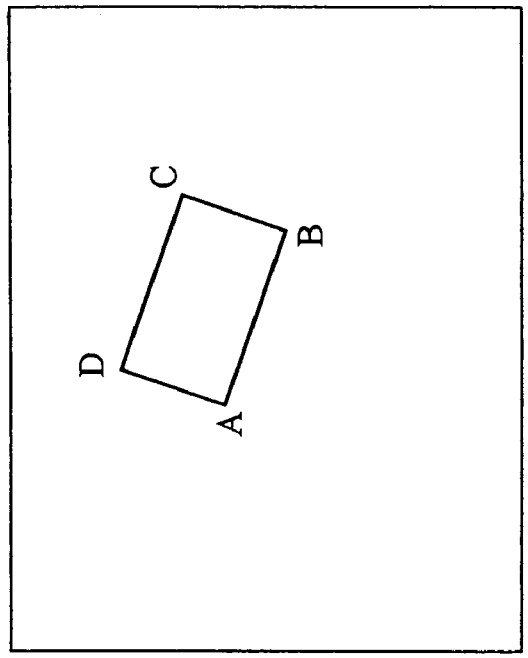
FIG. 15B schematically illustrates a graphics primitive in co-ordinate space.
Figure 15A:
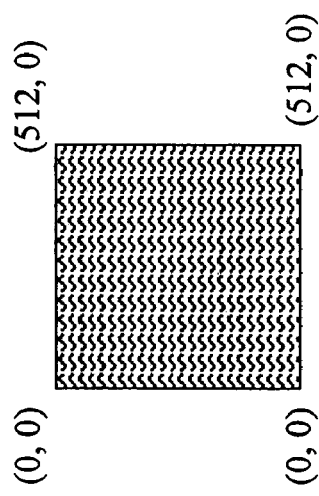
FIG. 15A schematically illustrates a portion of texture space.

FIG. 15 schematically illustrates how the wipe control signal is implemented by the Playstation2 during image processing in order to achieve the wipe effect. The wipe control signal is applied to graphics primitives of the image by the graphics synthesiser 200 in the same way that a texture would be applied to a graphics primitive. FIG. 15A represents a texture function in "texture space" and FIG. 15B illustrates a graphics primitive ABCD, to which the texture is to be applied.

The graphics synthesiser 200 performs texture mapping for all graphics primitives. Typically, the texture mapping is based on the co-ordinate values of the texture corresponding to each vertex of the graphics primitive. The texture function is essentially a set of values specifying modifications to the current pixel values of the graphics primitive to which the texture is to be applied. During the rasterization process described above with reference to FIG. 4, the graphics synthesiser 200 generates an RGBA value for each pixel of the graphics primitive.

When the texture function is applied to a graphics primitive the RGBA parameters of the texture ($R_t$, $G_t$, $B_t$, $A_t$) are blended with the parameters associated with the graphics primitive ($R_p$, $G_p$, $B_p$, $A_p$) to produce an output parameters ($R_o$, $G_o$, $B_o$, $A_o$). For example the texture function might be applied as follows:

$$R_o = R_t * R_p; \ G_o = G_t * G_p; \ B_o = B_t * B_p; \text{ and } A_o = A_t * A_p.$$

To perform the texture mapping the co-ordinate values of the texture in "texture space" must be mapped to the vertices of the graphics primitive in the display "coordinate space" which in this implementation has full-screen dimensions of 720 by 576, a standard resolution for PAL systems. Scaling and rotation of the texture may also need to be performed to ensure that its size and orientation correctly match the graphics primitive to which it is applied.

Figure 15C:
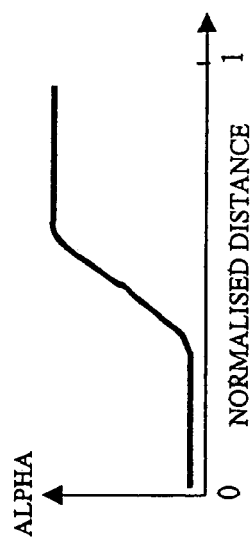
FIG. 15C schematically illustrates a wipe control signal which is applied as a one dimensional texture function to the graphics primitive.

As illustrated in FIG. 15C, the wipe control signal is applied to the graphics primitive as a one-dimensional texture function. The wipe control signal is used to modify only the alpha channel A of the RGBA video parameters. In this case the alpha value specified by the 1D texture function corresponding to normalised distance=0 is applied to all pixels along the line AD of the graphics primitive whilst the alpha value specified by the 1D texture function corresponding to normalised distance=1 is applied to all pixels along the line BC of the graphics primitive. Thus the alpha value varies within the graphics primitive in accordance with the 1D texture function in a direction parallel to AB. In this example the graphics primitive must be straddling the transition region of the wipe. In the case of the circular wipe of FIG. 9, the alpha values of all graphics primitives in the inner region are fixed at a low value corresponding to a high degree of transparency whereas the alpha values of the graphics primitives in the outer region would be set to a high value corresponding to an opaque image. In the transition region, the alpha values of the image pixels will vary in accordance with the wipe control signal along the wipe progression direction i.e. the 1D texture function is applied along the wipe progression direction.

The 1D texture function for each graphics primitive is derived from the global wipe control signal via the normalised distance to an associated display point. However the alpha values of the displayed image are modified pixel by pixel in accordance with the appropriate 1D texture function (defined via mapping from texture co-ordinates to screen co-ordinates). The wipe control signal is used to determine alpha values for pixels along a direction on the screen corresponding the wipe progression direction.

The alpha values $A_{texture}$ specified by the wipe control signal are applied as 1D textures to the graphics primitives and are used to replace the alpha channel $A_{S1}$ values of the first source video $S_1$. The alpha channel transformation ($A_{S1}$, $R_{S1}$, $G_{S1}$, $B_{S1}$)→($A_{texture}$, $R_{S1}$, $G_{S1}$, $B_{S1}$) is performed by modifying values in the frame buffer memory only, so there is no change to the video output at this stage. Once the alpha channel of the first source video $S_1$ has been replaced, the second source video $S_2$ is applied using the alpha channel values from the frame buffer memory $A_{texture}$ to define the mix. Thus:

$$\text{OutputColour} = A_{texture} * S_1 \text{Colour} + (1 - A_{texture}) * S_2 \text{Colour}$$

Where $S_1$Colour is $R_{S1}$, $G_{S1}$ or $B_{S1}$; $S_2$Colour is $R_{S2}$, $G_{S2}$ or $B_{S2}$; and OutputColour is the displayed colour resulting from the mix. The above formula assumes that $A_{texture}$ has been normalised.

For example for the circular wipe, replacement of the alpha channel of $S_1$ by values $A_{texture}$, specified by the wipe control signal of FIG. 10, will result in the inner region having a high degree of transparency, the transition region having a degree of transparency that progressively decreases from $r_1$ to $r_2$ and an outer region that is opaque. Thus when the second source video $S_2$ is applied and a mix is performed according to the above formula, the high degree of transparency of $S_2$ in the inner region will mean that the image visible there corresponds to $S_2$ whereas the opacity of $S_1$ in the outer region means that $S_2$ will not be visible there. In the transition region, $S_1$ is at least partially transparent so that the displayed image there has a partial contribution from the pixel values of both $S_1$ and $S_2$, the relative proportions having been defined via the wipe control function.

Figure 16:
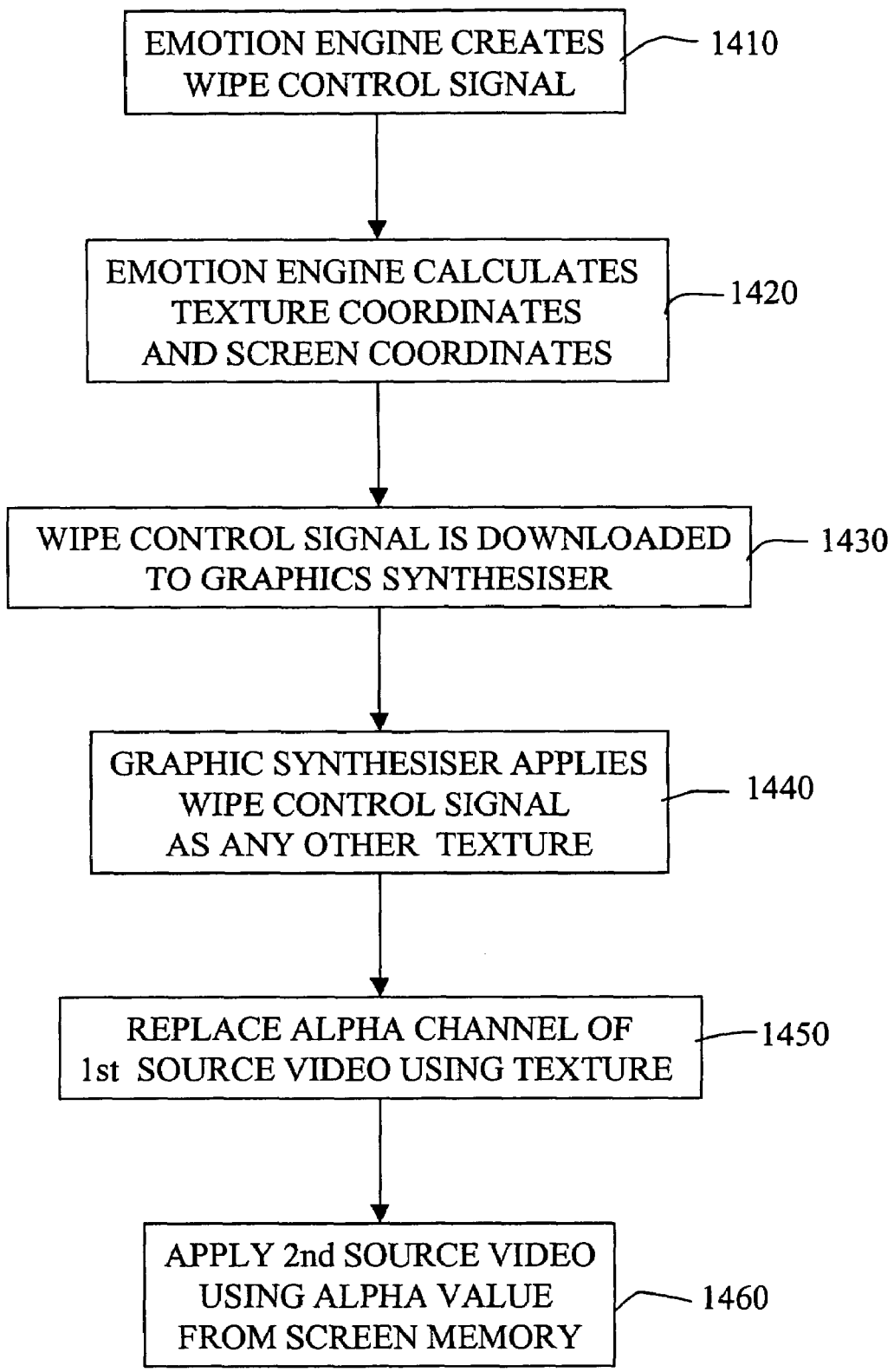
FIG. 16 is a flow chart explaining how a wipe is performed according to embodiments of the invention.

FIG. 16 is a flow chart that schematically illustrates how a wipe is performed according to embodiments of the invention. At step 1410 the emotion engine 100 generates a wipe control signal. At step 1420 the emotion engine calculates the texture co-ordinates and maps them to the appropriate screen co-ordinates. At stage 1430 the wipe control signal is downloaded from the emotion engine to the graphics synthesiser 200. At stage 1440 the graphics synthesiser applies the wipe control signal to the graphics primitives of the image by creating a 1D texture function for each graphics primitive. The 1D texture function is derived from the wipe control signal in dependence upon the location and orientation of the graphics primitive in relation to the wipe edge. At stage 1450 the result of applying the 1D texture functions to the graphics primitives are that the alpha channel $A_{S1}$ of the first source video $S_1$ is replaced by the value $A_{texture}$ specified by the 1D texture function. At stage 1460 the second source video $S_2$ is applied using alpha channel values $A_{texture}$ from screen memory. The result of the mix is displayed on the screen and has the effect of implementing the wipe at a particular wipe progression stage. The form of the wipe control signal changes as the wipe progresses, tracking the movement of the wipe boundary on the display screen.

It will be appreciated from the above that the invention may be implemented as computer software, which may be supplied on a storage medium or via a transmission medium such as a network or the internet.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A video processing method for generating output images for display, an output image having one or more regions derived from a first source image separated by a wipe boundary from one or more regions derived from a second source image, each display position of said source images having an associated transparency coefficient, said method comprising the steps of:
   (i) preparing said first source image for display in a display memory;
   (ii) defining a wipe origin locus representing a wipe boundary when substantially all of said output image is derived from said first source image and a wipe destination locus representing a wipe boundary when substantially all of said output image is derived from said second source image, points on said wipe destination locus being associated with points on said wipe origin locus, each such pair of associated points defining a respective wipe progression direction;
   (iii) generating a wipe control signal defining proportions of said first and second source images to be displayed with respect to a normalised display distance along a wipe progression direction from said wipe origin locus and said wipe destination locus;
   (iv) modifying said transparency coefficient of said first source image held in said display memory, said transparency coefficient of each display position being modified in dependence on value of said wipe control signal corresponding to said normalised display distance along said wipe progression direction between that display position and said wipe origin locus and between that display position and said wipe destination locus;
   (v) writing said second source image over said first source image in said display memory so that said first source image is modified by pixels of said second source image in dependence on said transparency coefficient associated with each display position of said first source image.

2. A method according to claim 1, in which said modifying step comprises the step of applying said wipe control signal as a one-dimensional texture function to said first source image held in said display memory.

3. A method according to claim 1, in which said modifying step comprises replacing said transparency coefficient associated with each display position of said first source image in said display memory by a value derived from said wipe control signal.

4. A method according to claim 1, in which a respective transparency coefficient is associated with each pixel of said source images.

5. A method according to claim 1, in which a user wipe control is arranged to alter said proportions of said output image derived from each of said source images.

6. A method according to claim 1, in which said wipe origin locus is a single point and said wipe destination locus defines a circle.

7. A method according to claim 1, in which said wipe origin locus and said wipe destination locus define parallel straight lines.

8. Computer software having program code for carrying out a method according to claim 1.

9. A providing medium which provides software according to claim 8.

10. A medium according to claim 9, said medium being a transmission medium.

11. A medium according to claim 9, said medium being a storage medium.

12. Video processing apparatus for generating output images for display, an output image having one or more regions derived from a first source image separated by a wipe boundary from one or more regions derived from a second source image, each display position of said source images having an associated transparency coefficient, said apparatus comprising:
   (i) a display memory;
   (ii) logic to prepare said first source image for display in said display memory;
   (iii) logic to define a wipe origin locus representing a wipe boundary when substantially all of said output image is derived from said first source image and a wipe destination locus representing a wipe boundary when substantially all of said output image is derived from said second source image, points on said wipe destination locus being associated with points on said wipe origin locus, each such pair of associated points defining a respective wipe progression direction;
   (iv) a generator to generate a wipe control signal defining proportions of said first and second source images to be displayed with respect to a normalised display distance along a wipe progression direction from said wipe origin locus and said wipe destination locus;
   (v) logic to modify said transparency coefficient of said first source image held in said display memory, said transparency coefficient of each display position being modified in dependence on value of said wipe control signal corresponding to said normalised display distance along said wipe progression direction between that display position and said wipe origin locus and between that display position and said wipe destination locus; and
   (vi) logic to write said second source image over said first source image in said display memory so that said first source image is modified by pixels of said second source image in dependence on said transparency coefficient associated with each display position of said first source image.

* * * * *